SIGNALLING SYSTEM

Filed March 15, 1963 3 Sheets-Sheet 1

Inventor
BRUNO F. J. MATTLET
By Philip M. Bolton
Attorney

April 5, 1966 B. F. J. MATTLET 3,245,066

SIGNALLING SYSTEM

Filed March 15, 1963 3 Sheets-Sheet 2

Inventor
BRUNO F. J. MATTLET
By Philip M. Bolton
Attorney

Inventor
BRUNO F. J. MATTLET
By Philip M. Bolton
Attorney

United States Patent Office 3,245,066
Patented Apr. 5, 1966

3,245,066
SIGNALLING SYSTEM

Bruno F. J. Maitlet, Antwerp, Belgium, assignor to International Standard Electric Corporation, New York, N.Y., a corporation of Delaware Filed Mar. 15, 1963, Ser. No. 265,406
Claims priority, application Netherlands, Mar. 23, 1962, 276,365
19 Claims. (Cl. 340—213)

Figures 1, 2A:
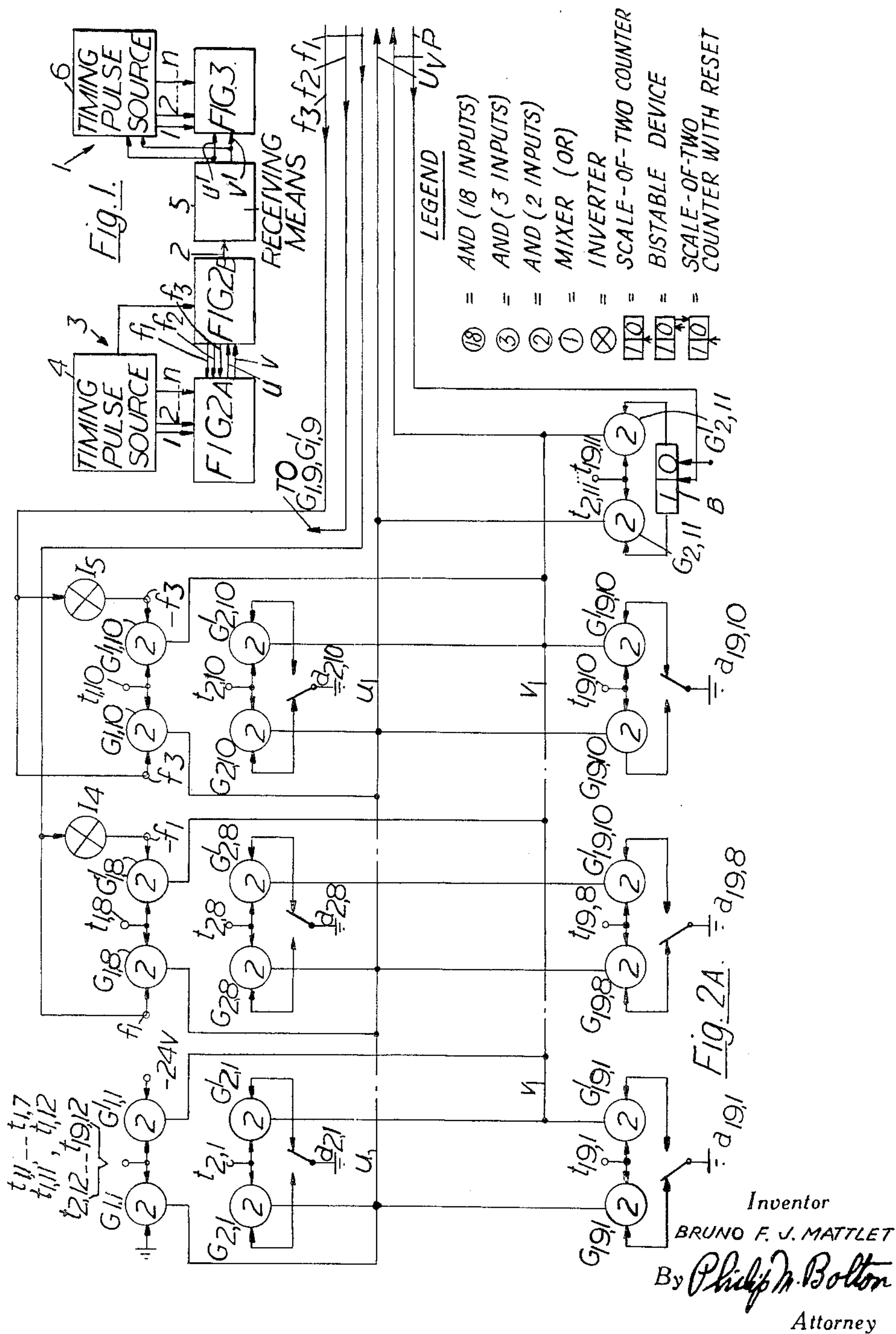

This invention relates to signalling systems and more particularly to a signalling system capable of indicating at a central station that at least one of a plurality of apparatus in a remotely located substation is in an erroneous condition and provides a positive identification of erroneously conditioned apparatus.

A signalling system is known in the prior art comprising a first and a second circuit linked by a transmission medium, a plurality of multicondition means in the first circuit, scanning means in the first circuit to sequentially scan each of the multicondition means during repetitive time cycles, transmitting means to transmit first signals indicative of the condition of the multicondition means through said transmission medium to said second circuit, and detecting means to detect predetermined conditions in the multicondition means.

Although the detecting means detected that at least one of the changeover contacts is in an erroneous condition, the system does not positively identify the changeover contacts which are in an erroneous condition.

It is, therefore, an object of the present invention to provide a signalling system which will positively identify in the second circuit the changeover contacts which are in an erroneous condition.

It is a further object of the present invention to provide a signalling system wherein a two-frequency modulator can be used.

A feature of this invention is the provision of a signalling system utilizing the components of the above-described prior art system wherein the detecting means included in the first circuit upon detecting the predetermined conditions in at least one of the multicondition means during any one of the repetitive time cycles will activate the transmitting means to transmit second signals indicative of the identity of the multicondition means having been found in the predetermined conditions to the said circuit during at least one time cycle after the time cycle during which the detecting means detected the predetermined conditions.

Another feature of this invention is that the first and second signals will be alternately transmitted as long as the predetermined conditions are present in at least one of the multicondition devices.

A further feature of this invention is the provision in the second circuit of a plurality of second multicondition means activated by a second scanning means to store the first signal, a plurality of identifying means activated by the second scanning means to store the second signal, a control means rendered operative only when the signals of a time cycle have been correctly received, and a plurality of third multicondition means coupled to the plurality of second multicondition means controlled by the second scanning means and the control means to transfer the signals stored in the second multicondition means to the third multicondition means.

Figure 2B:
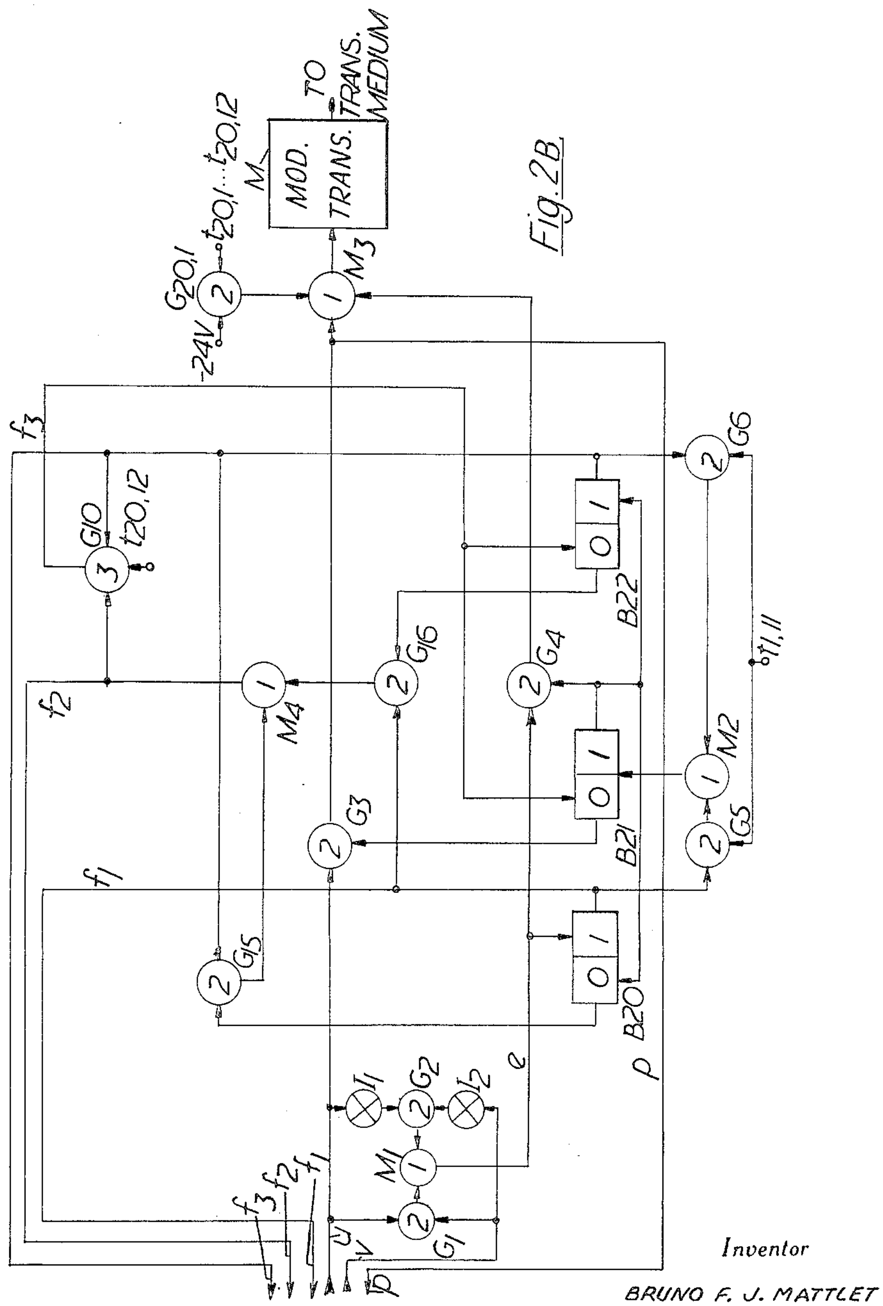
Figure 3:
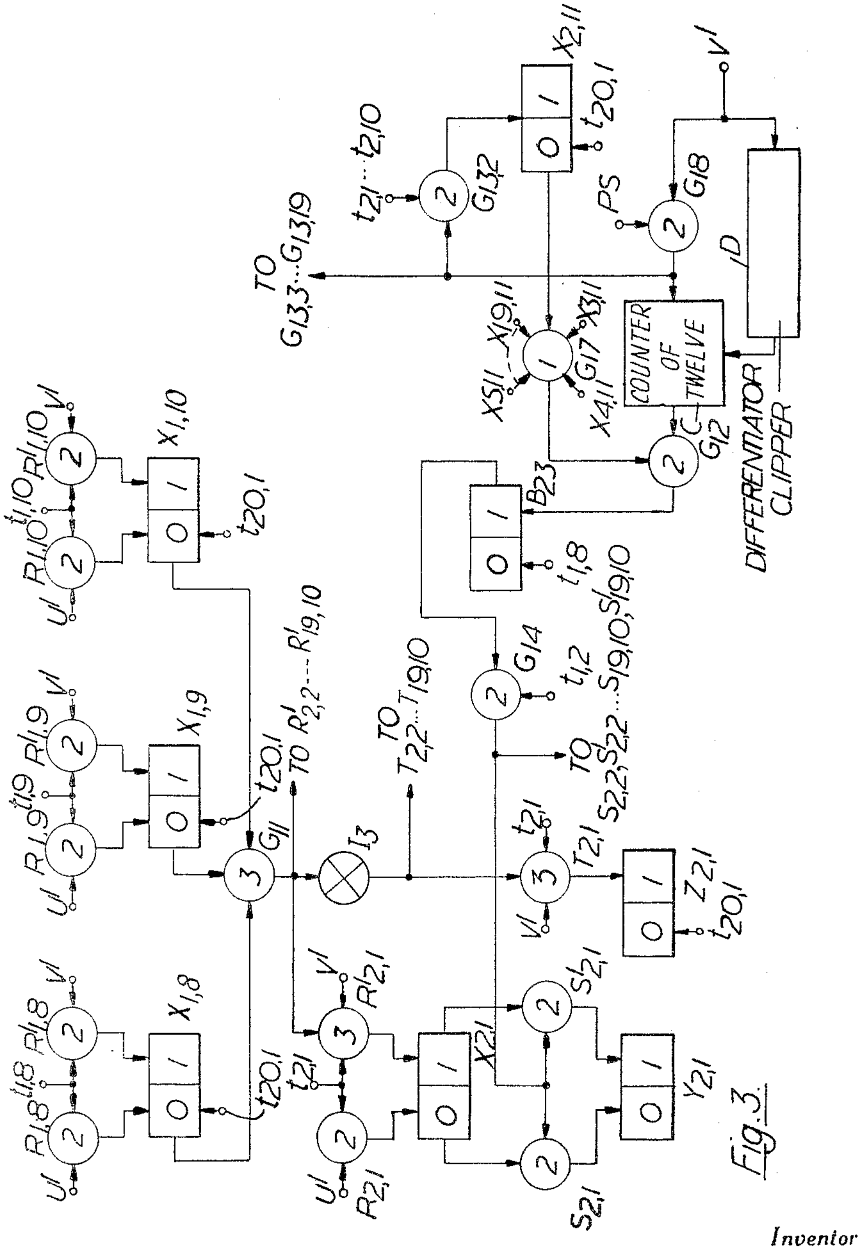

The above-mentioned and other features and objects of this invention will become more apparent by reference to the following description taken in conjunction with the accompanying drawings in which:

FIG. 1 is a schematic diagram in block form of a signalling system in accordance with the principles of this invention illustrating the cooperative relationship between FIGS. 2A, 2B, and 3;

FIGS. 2A and 2B taken together is a schematic illustration of a first circuit included in a substation in accordance with the principles of this invention; and FIG. 3 is a schematic illustration of a second circuit included in a main station in accordance with the principles of this invention.

The invention is directed to a signalling system in which a first circuit and a second circuit are linked by a transmission medium. The first circuit includes a plurality of multicondition means with scanning means operatively connected to the first circuit to scan all of the multicondition means during normal repetitive signal time cycles so as to activate the transmission means to successively transmit information signals relative to the sequentially scanned multi-condition means. Each transmitted signal simultaneously represents the condition "0" or "1" by the signal sent and the identity of the multicondition means by its time position in the scanning cycle. Error detecting means associated with the first circuit notes the occurrence of an error in any of the multicondition means during any one of the repetitive normal signal cycles and initiates an error cycle during which an error signal is transmitted to the second circuit during the time representative of the multicondition means having the error to thus identify the place of the error. The error detecting means includes gating means for alternately transmitting normal signal time cycles and error cycles until the errors have been eliminated at which time successive normal signal cycles resume.

Referring to FIG. 1, the invention will be described as applied to a system for signalling to a main station 1 in a continuous and cyclic manner over transmission medium 2 the positions of a plurality of apparatus located in a distant substation 3. Substation 3 includes the components described hereinbelow with respect to FIGS. 2A and 2B and a timing pulse source 4. Station 1 includes a receiving means 5 coupled to medium 2, the components described hereinbelow with respect to FIG. 3, and a timing pulse source 6.

Referring to FIG. 2A, substation 3 comprises, for instance, 180 apparatus (not shown) arranged in 18 rows of 10 each and these apparatus are in the operated or non-operated condition indicated by the position of the associated changeover contacts $a_{2,1}$ to $a_{2,10}$ . . . $a_{19,1}$ to $a_{19,10}$. Substation 3 further includes a scanning means, such as source 4 (FIG. 1), including a pulse generator driving a binary counter which is able to deliver $20\times 12$ negative timing pulses $t_{1,1}$ to $t_{1,2}$ . . . $t_{20,1}$ to $t_{20,12}$ varying between 0 volt (0-level) and −24 volts (1-level). Both the pulse source and the binary counter are well known in the art and, therefore, have been shown only in block form in FIG. 1.

The timing pulses $t_{1,1}$ to $t_{1,7}$, $t_{1,11}$ and $t_{1,12}$, $t_{2,12}$ . . . $t_{19,12}$ control the pair of two-input coincidence (AND) gates $G_{1,1}$ and $G'_{1,1}$ with gate $G_{1,1}$ being conditioned by a 0 volt potential (ground) and gate $G'_{1,1}$ being conditioned by a −24 volts potential. The output leads of gates $G_{1,1}$ and $G'_{1,1}$ are connected to common leads $u$ and $v$, respectively, so that the latter leads will be deactivated and activated, respectively, during the above timing pulses. In other words, during the above timing pulses, a 0-pulse will appear on common lead $u$ and simultaneously a 1-pulse will appear on common lead $v$.

The timing pulses $t_{1,8}$ to $t_{1,10}$ respectively control the pairs of two-input coincidence (AND) gates $G_{1,8}$, $G'_{1,8}$ to $G_{1,10}$, $G'_{1,10}$ with gate $G_{1,8}$ being conditioned by signal $f_1$, gate $G'_{1,8}$ being conditioned by the inverse of signal $f_1$ ($-f_1$) at the output of inverter $I_4$, gate $G_{1,9}$ being conditioned by signal $f_2$, gate $G'_{1,9}$ being conditioned by the inverse of signal $f_2$ ($-f_2$) at the output of an inverter (not shown), gate $G_{1,10}$ being conditioned by signal $f_3$, and gate $G'_{1,10}$ being conditioned by the inverse of signal $f_3$ $(-f_3)$ at the output of inverter $I_5$. The output leads of gates $G_{1,8}$, $G_{1,9}$ and $G_{1,10}$ are connected to common lead $u$ and the output leads of gates $G'_{1,8}$, $G'_{1,9}$ and $G'_{1,10}$ are connected to common lead $v$. The leads carrying signals $f_1$, $f_2$, $f_3$ are normally deactivated and, hence, the leads carrying signals $-f_1$, $-f_2$, $-f_3$ are activated so that normally during the time intervals $t_{1,8}$ to $t_{1,10}$ 0-pulses are applied to common lead $u$ and simultaneously 1-pulses are applied to common lead $v$.

The timing pulses $t_{2,1}$ to $t_{2,10}$ . . . $t_{19,1}$ to $t_{19,10}$ each control in common a pair of two-input coincidence (AND) gates which are also controlled by one of the above changeover contacts $a_{2,1}$ to $a_{2,10}$ . . . $a_{19,1}$ to $a_{19,10}$. For instance, changeover contact $a_{2,1}$ controls the pair of gates $G_{2,1}$, $G'_{2,1}$ which are also controlled in common by the timing pulse $t_{2,1}$. The output leads of gates $G_{2,1}$ . . . $G_{2,10}$ . . . $G_{19,1}$ . . . $G_{19,10}$ are connected to common lead $u$ and the output leads of gates $G'_{2,1}$ . . . $G'_{2,10}$ . . . $G'_{19,1}$ . . . $G'_{19,10}$ are connected to common lead $v$. It is clear that when a changeover contact is in its outermost left position, such as, for instance, $a_{19,1}$, a 0-pulse will be applied to common lead $u$ during the time position $t_{19,1}$ and simultaneously a 1-pulse will be applied to common lead $v$. On the other hand, when a changeover contact is in its outermost right position, such as, for instance, $a_{19,10}$, a 0-pulse will be applied to common lead $v$ during the time position $t_{19,10}$ and simultaneously a 1-pulse will be applied to common lead $u$.

The timing pulses $t_{2,11}$, $t_{3,11}$ . . . $t_{19,11}$ control the pair of AND gates $G_{2,11}$ and $G'_{2,11}$ which are also conditioned by the parity scale-of-two counter B. The appropriate conditioning is provided by having the 1-output of counter B connected to gate $G_{2,11}$ and its 0-output connected to gate $G'_{2,11}$. Counter B is designed in such a manner that an activated output is at a potential of $-24$ volts and a deactivated output is at a potential of 0 volt. For instance, when counter B is in its 0-condition its 0-output is at $-24$ volts and simultaneously its 1-output is at 0 volt. These conditions are reversed when counter B is in its 1-condition. It is further assumed that counter B is triggered into its other condition by a positive voltage step. Since the output lead of gate $G_{2,11}$ is connected to common lead $u$, 0-pulses will appear on this lead during the time positions $t_{2,11}$ to $t_{19,11}$ when counter B is in its 0-condition. Simultaneously 1-pulses will appear at common lead $v$. Due to the output lead of gate $G'_{2,11}$ being connected to common lead $v$, 0-pulses will be applied to lead $v$ during the time positions $t_{2,11}$ to $t_{19,11}$ when counter B is in its 1-condition. Simultaneously 1-pulses will be applied to common lead $u$.

Referring to FIG. 2B, common lead $u$ is connected via two-input coincidence AND gate $G_3$ and mixer $M_3$ to the input of modulator-transmitter M. When a 0-pulse is applied to modulator-transmitter M a signal of frequency $F-30$ is transmitted to main station 1. On the other hand when a 1-pulse is applied to modulator-transmitter M a signal of frequency $F+30$ is sent to main station 1. An input of mixer $M_3$ is connected to the output of two-input coincidence (AND) gate $G_{20,1}$ having one input connected to a $-24$ volts potential and the other input conditioned by the timing pulses $t_{20,1}$ to $t_{20,12}$.

From the above it follows that during the time positions $t_{1,1}$ . . . $t_{1,12}$, $t_{2,12}$ . . . $t_{19,12}$ pulses of frequency $F-30$ are transmitted to main station 1. The pulse generated during the time interval $t_{1,1}$ is called start pulse and the pulses generated during the time intervals $t_{1,2}$ to $t_{1,7}$ are called transfer pulses. The pulses appearing during the time intervals $t_{1,8}$ to $t_{1,10}$ are called error pulses and the pulses generated during the time intervals $t_{1,11}$, $t_{1,12}$, $t_{2,12}$ . . . $t_{19,12}$ are called space pulses. During the time positions $t_{2,1}$ to $t_{2,10}$ . . . $t_{19,1}$ to $t_{19,10}$ pulses of frequency $F-30$ or $F+30$ are transmitted to main station 1 depending on the position of the scanned changeover contacts. Finally, during the time positions $t_{20,1}$ to $t_{20,12}$ a series of synchronizing pulses having the frequency $F+30$ is transmitted to main station 1.

To enable the monitoring of the condition of contacts $a_{2,1}$ to $a_{2,10}$ . . . $a_{19,1}$ to $a_{19,10}$ and detect an erroneous condition of at least one of the contacts, the common lead $u$ is connected directly to one input of the two-input coincidence (AND) gate $G_1$ and to one input of the two-input coincidence (AND) gate $G_2$ through an inverter $I_1$ while common lead $v$ is connected directly to the other input of gate $G_1$ and to the other input of gate $G_2$ through an inverter $I_2$. The output leads of gates $G_1$ and $G_2$ are connected to the inputs of a two-input mixer $M_1$ having an output lead $e$.

As mentioned above, when a 1-pulse is applied to common lead $u$, a 0-pulse is applied to common lead $v$ and vice versa. Therefore, the two input leads of gates $G_1$ and $G_2$ can never be activated simultaneously in normal conditions. Hence, the output leads of gates $G_1$ and $G_2$, and, thus, the output lead of mixer $M_1$ can never be activated under normal conditions.

On the contrary, when, for instance, one of the changeover contacts makes contact with an input lead of both the gates it controls, the output of the mixer $M_1$ will be activated. For instance, when changeover contact $a_{2,1}$ is connected to gate $G_{2,1}$ as well as to gate $G'_{2,1}$, a 0-pulse will be applied to inverters $I_1$ and $I_2$ during the time interval $t_{2,1}$ over leads $u$ and $v$ so that the inputs of gate $G_2$ will both become activated. Hence, the output of gate $G_2$ and mixer $M_1$ will be activated. Also, when a changeover contact does not make contact with either of its associated gates the output of mixer $M_1$ will be activated. For instance, when changeover contact $a_{2,1}$ is not connected to either gates $G_{2,1}$ and $G'_{2,1}$ a 1-pulse will be applied to both leads $u$ and $v$ during the time interval $t_{2,1}$. Hence, the two inputs of gate $G_1$ will both be activated, thereby activating the output of gate $G_1$ and the output of mixer $M_1$.

From the above it follows that in the case of an erroneously positioned contact detected during a particular time interval the output lead $e$ of the mixer $M_1$, which is connected to the 1-input of the bistable device $B_{20}$, is activated. Due to this bistable device $B_{20}$ is triggered into its 1-condition at the end of this particular time interval, thus memorizing the fact that an error has occurred. The signalling cycle during which this happens is however continued i.e. the positions of the changeover contacts are signalled to main station 1 via gate $G_3$, mixer $M_3$ and the modulator-transmitter M. In other words an erroneously positioned contact does not halt the signalling cycle even though the error is noted.

The 1-output (lead $f_1$) of bistable device $B_{20}$ is connected to one of the inputs of the two-input coincidence gate $G_{1,8}$ and the 1-output (lead $f_3$) of the bistable device $B_{22}$ is connected to one of the inputs of gate $G_{1,10}$. The 0-output of bistable device $B_{20}$ and the 1-output bistable device $B_{22}$ are connected to the inputs of the two-input coincidence (AND) gate $G_{15}$ and the 1-output of bistable device $B_{20}$ and the 0-output of bistable device $B_{22}$ are connected to the inputs of the two-input coincidence (AND) gate $G_{16}$. The outputs of gates $G_{15}$ and $G_{16}$ are connected to the input of mixer $M_4$ having its output lead $f_2$ connected to one of the inputs of the two-input coincidence gate $G_{1,9}$ (not shown).

From these connections it follows that:

When bistable device $B_{20}$ is in its 1-condition and bistable device $B_{22}$ is in its 0-condition, output leads $f_1$ and $f_2$ are activated and output lead $f_3$ is deactivated;

When bistable devices $B_{20}$ and $B_{22}$ are in their 1-condition, output leads $f_1$ and $f_3$ are activated and output lead $f_2$ is deactivated;

When bistable device $B_{20}$ is in its 0-condition and bistable device $B_{22}$ is in its 1-condition, output lead $f_1$ is deactivated and output leads $f_2$ and $f_3$ are activated.

From the above it follows that after an error has been detected for the first time, output leads $f_1$ and $f_2$ are activated and output lead $f_3$ is deactivated.

During the time intervals $t_{1,8}$ to $t_{1,10}$ of the following cycle the output leads of gates $G_{1,8}$ and $G_{1,9}$ will, therefore, be activated and the output lead of gate $G_{1,10}$ will be deactivated (FIG. 2A).

Hence, during the latter time intervals two pulses of frequency $F+30$ and a pulse of frequency $F-30$, or in other words, the code 110, is transmitted to main station 1 to indicate that a first error signalling cycle is started. During the immediately following time interval $t_{1,11}$, the timing pulse $t_{1,11}$ is applied to gate $G_5$ providing an output therefrom since bistable device $B_{20}$ is in its 1-condition. The pulse appearing at the output of gate $G_5$ is applied via mixer $M_2$ to the scale-of-two counter $B_{21}$ which is triggered into its 1-condition at the end of timing pulse $t_{1,11}$.

The 0-output of counter $B_{21}$ is connected to one of the inputs of gate $G_3$, the other input thereof being connected to lead $u$ and the 1-output of counter $B_{21}$ is connected to one of the inputs of the two-input coincidence (AND) gate $G_4$, the other input thereof being connected to output lead $e$ of mixer $M_1$. Due to bistable device $B_{21}$ being in its 1-condition, the pulses applied to gate $G_3$ via lead $u$ during the following timing pulses are no longer able to pass through this gate. On the other hand, error signals appearing at the output of mixer $M_1$ are able to pass through gate $G_4$, mixer $M_3$ and modulator-transmitter M. Since for each error, the output of mixer $M_1$ is activated, it is clear that for each such error a pulse of frequency $F+30$ will be transmitted to main station 1.

After synchronizing pulses of this first error signalling cycle has been transmitted to station 1, the start and transfer pulses of the following cycle are transmitted and during the time interval $t_{1,11}$ of the latter cycle a timing pulse $t_{1,11}$ is applied to gate $G_5$ providing an output therefrom operating to reset counter $B_{21}$ to its 0-condition. Hence, the input leads of gates $G_3$ and $G_4$ coupled to counter $B_{21}$ are activated and deactivated, respectively, so that error signals are again prevented from being applied to modulator-transmitter M and the other signals may be applied thereto. Due to bistable device $B_{21}$ being brought into its 0-condition a positive pulse appears at its 1-output so that bistable device $B_{20}$ is reset to its 0-condition and bistable device $B_{22}$ is brought into its 1-condition. Bistable device $B_{22}$ thus memorizes the fact that a first error signalling cycle has occurred.

When the error persists, it will again be registered by bistable device $B_{20}$ during the normal signalling cycle taking place. Consequently, at the end of this normal signalling cycle bistable devices $B_{20}$ and $B_{22}$ are both in their 1-condition and due to this output leads $f_1$ and $f_3$ are activated and output lead $f_2$ remains deactivated. Consequently, the code 101 will be transmitted to main station 1 during the time positions $t_{1,8}$ to $t_{1,10}$ of the following cycle when scanning gates $G_{1,8}$, $G'_{1,8}$ to $G_{1,10}$, $G'_{1,10}$. This code indicates that the cycle started is an error cycle which is not the first one. From the time position $t_{1,11}$ on of this cycle, the errors are then transmitted to main station 1.

At the time position $t_{1,11}$ of the following cycle, bistable device $B_{21}$ is again triggered into its 1-condition so that a normal signalling cycle may take place and bistable device $B_{20}$ is triggered back into its 0-condition by the pulse appearing at the 1-output of bistable device $B_{21}$. Hence, at the start of the following cycle bistable devices $B_{20}$, $B_{21}$ and $B_{22}$ are in the same condition as at the start of the above second error signalling cycle. Also the same code 101 will be transmitted to main station 1 during the error signalling cycles as long as the error in substation 3 persists.

Suppose now that the errors which have previously been transmitted to main station 1 have disappeared, then it is clear that bistable $B_{20}$ will not be operated during a normal signalling cycle. Hence, the timing pulse $t_{1,11}$ will not be able to trigger counter $B_{21}$ to its 1-condition via gate $G_5$ and mixer $M_2$ since bistable device $B_{20}$ has remained in its 0-condition. Bistable device $B_{21}$ will, however, be triggered into its 1-condition by the timing pulse $t_{1,11}$ via gate $G_6$ and mixer $M_2$ due to bistable device $B_{22}$ being in its 1-condition. An error signalling cycle may, therefore, take place in the same manner as described above.

Due to bistable devices $B_{20}$ and $B_{22}$ being in their 0 and 1-condition, respectively, output lead $f_1$ is deactivated and output leads $f_2$ and $f_3$ are both activated at the time positions $t_{1,8}$ to $t_{1,10}$. Consequently, the code 011 will be transmitted to main station 1 during these time positions to indicate that the last error signalling cycle is taking place.

Due to output leads $f_2$ and $f_3$ being activated, it is clear that the output lead of the three-input coincidence gate $G_{10}$ will be activated when the last timing pulse $t_{20,12}$ is applied thereto. Consequently, bistable devices $B_{21}$ and $B_{22}$ are reset to their 0-condition at the end of this timing pulse.

The above-described parity counter B is provided for controlling the transmission of the signals stored in substation 3. Therefore, parity counter B is brought into such a condition that when scanning the changeover contacts of a row of such contacts together with parity counter B, an even number of pulses having the frequency $F+30$ is transmitted to main station 1.

In order to count the number of 1's registered in each of the rows 2 to 19, the output of gate $G_3$ is connected to counter B. Counter B is reset at the end of the scanning of each row by the timing pulses $t_{1,12}$ to $t_{18,12}$. The operation is as follows.

When the number of 1's registered in a row is even, for instance, when the number of 1's registered by the row of changeover contacts $a_{2,1}$ to $a_{2,10}$ is even, counter B will be triggered an even number of times during the time positions $t_{2,1}$ to $t_{2,10}$ so that it will again be in its 0-condition at the end of the time position $t_{2,10}$. Hence, when the timing pulse $t_{2,11}$ is applied to gates $G_{2,11}$ and $G'_{2,11}$ a 0-pulse will be applied to modulator-transmitter M. On the contrary, when the number of 1's registered by contacts $a_{2,1}$ to $a_{2,10}$ is odd, counter B will be triggered an odd number of times during the time position $t_{2,1}$ to $t_{2,10}$ so that it will be in its 1-condition at the end of the time position $t_{2,10}$. Hence, when the timing pulse $t_{2,11}$ is applied to gates $G_{2,11}$ and $G'_{2,11}$ a 1-pulse will be applied to modulator-transmitter M. The number of 1's sent to modulator-transmitter M by the scanning of the row of contacts $a_{2,1}$ to $a_{19,10}$ and counter B is thus made even.

The receipt in main station 1 of the signals at frequency $F+30$ or $F-30$ emitted by substation 3 will now be described.

Referring to FIG. 3, main station 1 is provided with a timing pulse source 6, as illustrated in FIG. 1, including a pulse generator driving a binary counter which is able to deliver $20\times12$ timing pulses $t_{1,1}$ to $t_{20,12}$. A number of 180 bistable devices $X_{2,1}$ . . . $X_{2,10}$ . . . $X_{19,1}$ . . . $X_{19,10}$ has been provided for registering the position of the 180 changeover contacts located in substation 3. These bistable devices are arranged in 18 rows of 10 each. Each of these bistable devices have the output of a two-input coincidence (AND) gate $R_{2,1}$ . . . $R_{2,10}$ . . . $R_{19,1}$ . . . $R_{19,10}$ coupled to its 0-input and the output of a three-input coincidence (AND) gate $R'_{2,1}$ . . . $R'_{2,10}$ . . . $R'_{19,1}$ . . . $R'_{19,10}$ coupled to its 1-input. Each of the two-input coincidence gates is controlled by one of the above timing pulses and by the signal on the common output lead $u'$ and each of the three-input coincidence gates is controlled by the same timing pulse, by the signal on the common output lead $v'$ and by an output from a three-input coincidence (AND) gate $G_{11}$. On the drawing for clarity and simplicity, only bistable device $X_{2,1}$ and the associated gates $R_{2,1}$ and $R'_{2,1}$ have been shown.

Three bistable devices $X_{1,8}$ to $X_{1,10}$ have further been provided in order to receive the error code. These bistable devices are coupled to be controlled by the pairs of gates $R_{1,8}$, $R'_{1,8}$ to $R_{1,10}$, $R'_{1,10}$, respectively, which are in turn controlled by the timing pulses $t_{1,8}$ to $t_{1,10}$ and by leads $u'$ and $v'$.

The signals at frequency $F-30$ or $F+30$ are received by receiving means 5 (FIG. 1) having output leads $u'$ and $v'$. In receiving means 5 the signals at frequency $F-30$ and $F+30$ received are demodulated and appear as direct current pulse trains at the output leads $u'$ and $v'$, respectively. This means that for a 0-pulse in substation 3 lead $u'$ is activated and for a 1-pulse in substation 3 lead $v'$ is activated. It should further be noted (see FIG. 1) that the pulse generator of timing pulse source 6 for driving the binary counter is actually obtained by mixing the signals appearing on leads $u'$ and $v'$, thereby synchronizing source 6 with source 4. The $u'$ and $v'$ signals to pulse source 6, coupled with the synchronizing pulses $t_{20,1}$ to $t_{20,12}$ control the synchronization of source 6 with source 4.

The operation at main station 1 will now be described by first considering a signalling cycle. During the time intervals $t_{1,1}$ to $t_{1,7}$ the start and transfer pulses are received in main station 1. During the time positions $t_{1,8}$ $t_{1,10}$ the so called error code is received. Normally this code is 000 indicating that no error has been detected. Upon receipt of this code bistable devices $X_{1,8}$ to $X_{1,10}$ will remain in their 0-condition since only the output leads of gates $R_{1,8}$ to $R_{1,10}$ are activated during the time intervals $t_{1,8}$ to $t_{1,10}$.

During the time positions $t_{2,1}$ to $t_{19,10}$ the different bistable devices $X_{2,1}$ to $X_{19,10}$ are brought in the position corresponding to the position of the changeover contacts located in substation 3. For instance, when an active pulse is applied to lead $u'$ of gate $R_{2,1}$ bistable device $X_{2,1}$ will be brought to its 0-condition, or maintained in that condition and when an active pulse is applied to lead $v'$ of gate $R'_{2,1}$ bistable device $X_{2,1}$ will be brought to its 1-condition, or maintained in that condition.

Each of the registering bistable devices $X_{2,1}$ to $X_{19,10}$ is coupled to an auxiliary bistable device $Y_{2,1}$ to $Y_{19,10}$ as follows. The 0-output of each registering bistable device is connected to one input of a first gate $S_{2,1}$ to $S_{19,10}$ of a pair of two-input coincidence (AND) gates and the 1-output of each registering bistable device is connected is one input of a second gate $S'_{2,1}$ to $S'_{19,10}$ of said pair of two-input coincidence gates. The other input of said first and second gates is controlled in common by the output of a two-input coincidence (AND) gate $G_{14}$. The outputs of said first and second gates are connected to the 0-input and the 1-input, respectively, of the auxiliary bistable device. For instance, the 0-output and the 1-output of bistable device $X_{2,1}$ are connected to the 0-input and the 1-input of bistable device $Y_{2,1}$ via gates $S_{2,1}$ and $S'_{2,1}$, respectively.

Before transferring the information registered in the different bistable devices $X_{2,1}$ to $X_{19,10}$ towards the associated auxiliary bistable devices $Y_{2,1}$ to $Y_{19,10}$ wherein the information is to be definitely stored, the information is checked to determine if the signalling cycle has been correctly received, that is, that the binary counter of pulse source 6 has really reached its final position and that the synchronizing pulse has been completely received as will be described hereinafter.

FIG. 3 illustrates the use of timing pulses along with the V' input, the counter of twelve C, the parity counters $X_{2,11}$ to $X_{19,11}$, gate 17 and bistable device $B_{23}$ to transfer the condition information stored in $X_{2,1}$ to $X_{19,10}$ into storage devices $Y_{2,1}$ to $Y_{19,10}$ at the end of time interval $t_{1,2}$, in the absence of error signal indications at bistable devices $X_{1,8}$ to $X_{1,10}$. Error pulses are registered in bistable devices $Z_{2,1}$ to $Z_{19,10}$ via gates $T_{2,1}$ to $T_{19,10}$, respectively. The X and Z bistable devices near the end of each timing cycle by the timing pulse $t_{20,1}$. A more detailed description of the above described operations now follows.

The lead $v'$ which is activated for each 1-pulse appearing in substation 3 is connected to one input of the two-input coincidence (AND) gate $G_{18}$, the other input of which is connected to the output of a pulse source PS. Source PS generates negative trigger pulses varying between 0 volt and $-24$ volts time to occur in the middle of the time positions $t_{1,1}$ to $t_{20,12}$. The output of gate $G_{18}$ is connected to a counter-of-twelve C and also to one input of a plurality of two-input coincidence (AND) gate $G_{13,2}$ to $G_{13,19}$, the second inputs of which are controlled by the timing pulses $t_{2,1}$ to $t_{2,10}$ . . . $t_{19,1}$ to $t_{19,10}$. Only gate $G_{13,2}$ has been shown. The lead $v'$ is also connected to a differentiator and clipper circuit D designed to generate positive trigger pulses at the end of each negative pulse appearing on lead $v'$. From the above it follows that the counter C will be stepped to a following position in the middle of each time interval by the output of gate $G_{18}$ during which lead $v'$ is activated by the output of gate $G_{18}$ being activated and that it will be reset each time lead $v'$ is deactivated by the output of circuit D being activated.

The output of counter C is connected to one input of a two-input coincidence (AND) gate $G_{12}$ which is controlled by the output of an eighteen-input coincidence (AND) gate $G_{17}$. It is clear that the output of counter C will only be activated when it has counted 12.

The outputs of gates $G_{13,2}$ to $G_{13,19}$ are each connected to one of the so-called parity scale-of-two counters $X_{2,11}$ to $X_{19,11}$, each of which is associated with a row of bistable devices $X_{2,1}$ to $X_{2,10}$ . . . $X_{19,1}$ to $X_{19,10}$. Each of parity counters $X_{2,11}$ to $X_{19,11}$ operate to control the parity of the row to which it is associated, for instance, parity counter $X_{2,11}$ is associated with the row of bistable devices $X_{2,1}$ to $X_{2,10}$. When the number of 1's registered in a row in substation 3 is even, lead $v'$ and, hence the output of gate $G_{18}$ will be activated an even number of times during the scanning interval of this row. The results in the associated parity scale-of-two counter $X_{2,11}$ to $X_{19,11}$ being triggered an even number of times and, hence, will be in its 0-condition at the end of the scanning period of this row. However, when the number of 1's registered in a row in substation 3 is odd, lead $v'$ and, hence, the output lead of gate $G_{18}$ will be activated an odd number of times. This results in the associated parity scale-of-two counter $X_{2,11}$ to $X_{19,11}$ being triggered an odd number of times and, hence, will be in its 1-condition at the end of the scanning period of this row.

From the above it follows that all the parity scale-of-two counters are in their 0-condition after the scanning of the rows 2 to 19 when the parity of each of these rows is correct. Hence, the output lead of gate $G_{17}$ having its inputs connected to the 0-outputs of bistable devices $X_{2,11}$ to $X_{19,11}$ will be activated.

Since the output lead of gate $G_{17}$ is connected to the input of a two-input coincidence (AND) gate $G_{12}$, the other input of which is conditioned by the output of counter C, it is clear that the output of gate $G_{12}$ will only be activated when simultaneously counter C is in its final position and the parity of all the rows scanned is correct.

Supposing that this is the case, bistable device $B_{23}$ having its 1-input connected to the output of gate $G_{12}$ will be triggered into its 1-condition at the moment counter C is reset to its 0-position. The 1-output of bistable device $B_{23}$ is connected to one input of the two-input coincidence (AND) gate $G_{14}$, the other input of which is controlled by the transfer pulse $t_{1,2}$. Thus, when bistable device $B_{23}$ has been triggered into its 1-condition the information stored in all the bistable devices, such as $X_{2,1}$, will be transferred to the corresponding auxiliary bistable devices, such as $Y_{2,1}$, via the gates, such as $S_{2,1}$ and $S'_{2,1}$, at the end of the time interval $t_{1,2}$.

The 0-output leads of bistable devices $X_{1,8}$ to $X_{1,10}$ constitute the inputs of gate $G_{11}$, the output of which is connected to one input of the three-input coincidence gates $R'_{2,1}$ to $R'_{19,10}$ coupled to the bistable devices $X_{2,1}$ to $X_{19,10}$ and also to one input of the three-input coincidence gates $T_{2,1}$ to $T_{19,10}$ via inverter $I_3$. The outputs of gates $T_{2,1}$ to $T_{19,10}$ are connected to the 1-inputs of the error bistable devices $Z_{2,1}$ to $Z_{19,10}$, respectively. The other two inputs are a corresponding timing pulse and lead $v'$. For instance, gate $T_{2,1}$ is coupled to error bistable device $Z_{2,1}$ and has its three inputs connected to the output of inverter $I_3$, lead $v'$ and the timing pulse $t_{2,1}$.

In normal conditions, bistable devices $X_{1,8}$ to $X_{1,10}$ are in their 0-condition and the output lead of gate $G_{11}$ is activated. This results in the priming of gates $R'_{2,1}$ to $R'_{19,10}$ and blocking gates $T_{2,1}$ to $T_{19,10}$ through the operation of inverter $I_3$.

Upon an error code being received at least one of bistable devices $X_{1,8}$ to $X_{1,10}$ is triggered into its 1-condition, resulting in the deactivation of the output of gate $G_{11}$ and, hence, gates $R'_{2,1}$ to $R'_{19,10}$ are blocked and gates $T_{2,1}$ to $T_{19,10}$ are primed. Consequently, error pulses appearing on lead $v'$ are prevented from being registered in bistable devices $X_{2,1}$ to $X_{19,10}$. However, the error pulses are registered in bistable devices $Z_{2,1}$ to $Z_{19,10}$ via gates $T_{2,1}$ to $T_{19,10}$, respectively. Bistable devices $Z_{2,1}$ to $Z_{19,10}$ and bistable devices $X_{1,8}$ to $X_{1,10}$, $X_{2,11}$ to $X_{19,11}$ are reset to their 0-condition near the end of each timing cycle by the timing pulse $t_{20,1}$. Bistable device $B_{23}$ is reset at the end of the timing pulse $t_{1,8}$.

While I have described above the principles of my invention in connection with specific apparatus, it is to be clearly understood that this description is made only by way of example and not as a limitation to the scope of my invention as set forth in the objects thereof and in the accompanying claims.

I claim:

1. A signalling system comprising:
first and second time synchronized circuits interconnected by a transmission medium;
a plurality of first multicondition means disposed in said first circuit;
first scanning means in said first circuit to sequentially scan each of said first multicondition means during normal repetitive signalling time cycles;
transmitting means coupled to said first multicondition means to transmit first signals indicative of the condition and identity of said first multicondition means through said transmission medium to said second circuit;
detecting means coupled to said first multicondition means to detect predetermined error conditions of at least one of said first multicondition means during any one of said normal repetitive signalling time cycles; and
means coupled to said detecting means and said transmitting means to activate said transmitting means in response to an output from said detecting means to transmit second signals during an error time cycle which by their timing are indicative of the identity of the erroneous multicondition means having said predetermined error conditions during at least one error time cycle after the signal time cycle during which said detecting means detected said predetermined conditions.

2. A system according to claim 1, wherein the error time cycles during which said second signals are transmitted are repeatedly interleaved with those signalling time cycles during which said first signals are transmitted as long as at least one of said first multicondition means remains in at least one of said predetermined error conditions.

3. A system according to claim 1, wherein a error time cycle during which said second signals are transmitted immediately follows the signalling time cycle during which said detecting means detects at least one of said predetermined error conditions.

4. A system according to claim 1, wherein each of said first multicondition means may exhibit at least one of said predetermined error conditions in addition to two other distinct conditions normally signalled to said second circuit.

5. A system according to claim 4, wherein
each of said first multicondition means includes
a pair of gates normally in complementary conditions, and a pair of first bistable devices coupled to control the conditions of said gates,
said complementary conditions corresponding to said distinct conditions and like conditions of said gates corresponding to said predetermined conditions;
said first scanning means is coupled to each of said pairs of gates to successively produce at the output of each of said pairs of gates pairs of normally complementary binary signals;
said detecting means includes
first means coupled to the output of each of said pairs of gates to detect the presence or absence of said complementary binary signals in at least one normal time cycle and produce an error signal when said binary signals are not complementary,
a second bistable device coupled to said first means responsive to said error signal to change from a first condition to a second condition, and
second means coupled to said second bistable device responsive to said second condition to substitute an error time cycle for at least the time cycle following the time cycle during which said second bistable device was changed to said second condition; and
said transmitting means is coupled to the output of each of said pair of gates and said second means to transmit said first signal indicative of said pairs of binary signals during said normal time cycle and said second signal indicative of said pairs of binary signals that are not complementary during said error time cycle.

6. A system according to claim 5, including
means coupled to said first scanning means and said detecting means to produce for transmission to said second circuit a first code at the start of each of said normal time cycle, a second code at the start of the first of said error time cycles, a third code at the start of the second, third . . . , and penultimate of said error time cycles and a fourth code (011) at the start of the last of said error time cycle.

7. A system according to claim 5, wherein
the output of the first gate of each of said pair of gates is coupled to a first common lead;
the output of the second gate of each of said pair of gates is coupled to a second common lead;
said first means is coupled to said first and second common leads;
the 1-input of said second bistable device is coupled to the output of said first means; and
said second means includes
a third gate having one input coupled to said first common lead and the output coupled to said transmitting means,
a fourth gate having one input coupled to the output of said first means and the output coupled to said transmitting means,
a first scale-of-two counter having its 0-output coupled to the other input of said third gate and its 1-output coupled to the other input of said fourth gate, and
third means coupled to said first counter to alternately trigger said first counter into its 0-condition and into its 1-condition at the start of each normal time cycle and at the start of each error time cycle, respectively.

8. A system according to claim 7, wherein said third means includes a third bistable device having its 1-input coupled to the 1-output of said first counter;
a fifth gate having one input coupled to the 1-output of said third bistable device and the other input coupled to said first scanning means;
a sixth gate having one input coupled to the 1-output of said second bistable device and the other input coupled to said scanning means; and
a first mixer coupled to the outputs of said fifth and sixth gates and the input of said first counter.

9. A system according to claim 8 further including
a seventh gate having one input coupled to the 0-output of said second bistable device and the other input coupled to the 1-output of said third bistable device;
an eighth gate having one input coupled to the 0-output of said third bistable device and the other input coupled to the 1-output of said second bistable device;
a second mixer having one input coupled to the output of said seventh gate and the other input coupled to the output of said eighth gate; and
three pairs of ninth gates having
one input of each of said ninth gates coupled to said first scanning means and controlled thereby,
the other input of said ninth gates of the first pair of said three pairs of ninth gates coupled to the 1-output of said second bistable device and controlled by the ouput signal therefrom and the inverse thereof,
the other input of said ninth gates of the second pair of said three pairs of ninth gates coupled to the output of said second mixer and controlled by the output signal therefrom and the inverse thereof, and
the other input of said ninth gates of the third pair of said three pairs of ninth gates coupled to the 1-output of said third bistable device and controlled by the ouput signal therefrom and the inverse thereof.

10. A system according to claim 7, wherein
said pairs of first bistable devices are arranged in a plurality of groups; and
said system further includes
a first parity scale-of-two counter having the common input coupled to the output of said third gate and the 0-input coupled to said first scanning means,
a pair of tenth gates each having one input coupled to said first scanning means, one of said tenth gates having the other input coupled to the 0-output of said first parity counter and the other of said tenth gates having the other input coupled to the 1-output of said first parity counter,
said tenth gates being activated by said first scanning means after activating said pairs of gates associated with said first bistable devices of each of said groups, and
said first parity counter is reset to its 0-condition between two successive activations of said tenth gates.

11. A system according to claim 1, wherein said second circuit includes
a plurality of second multicondition means;
first gating means coupled to each of said second multicondition means;
second scanning means coupled to each of said first gating means for control thereof to enable said first signals to be stored in said second multicondition means;
a plurality of identifying means; and
second gating means coupled to each of said identifying means and said second scanning means, said second scanning means controlling said second gating means to enable said second signals to be stored in said identifying means.

12. A system according to claim 11, wherein said second circuit includes
a plurality of third multicondition means;
third gating means coupled to each of said third multicondition means, each of said second multicondition means, and said second scanning means; and
a control means coupled to said third gating means actuated only when the signals of a time cycle have been correctly received;
said second scanning means and said control means controlling said third gating means to transfer the signals stored in said second multicondition means to said third multicondition means.

13. A system according to claim 11, wherein
each of said second multicondition means includes
a fourth bistable device;
each of said first gating means includes
a pair of eleventh gates each having one input coupled to said second scanning means and another input coupled to said transmission medium for response to said first signals during a normal time cycle, one of said eleventh gates having its output coupled to the 0-input of the associated one of said fourth bistable devices and the other of said eleventh gates having its output coupled to the 1-input of said associated one of said fourth bistable devices;
each of said identifying means includes
a fifth bistable device; and
each of said second gating means includes
a twelfth gate having one input coupled to said second scanning means, another input coupled to said transmission medium for response to said second signals during an error time cycle, and the output coupled to the 1-input of the associated one of said fifth bistable devices.

14. A system according to claim 12, wherein
each of said second multicondition means includes
a fourth bistable device;
each of said third multicondition means includes
a sixth bistable device; and
each of said third gating means includes
a pair of thirteenth gates each having one input coupled to said control means, one of said thirteenth gates having the other input coupled to the 0-output of the associated one of said fourth bistable devices and the output coupled to the 0-input of the associated one of said fifth bistable devices, and the other of said thirteenth gates having the outer input coupled to the 1-input of said associated one of said fourth bistable devices and the output coupled to the 1-input of said associated one of said fifth bistable devices.

15. A system according to claim 14, wherein
a predetermined signal is included at the end of each correct time; and
said control means includes
a first checking circuit producing an output signal upon receipt of said predetermined signal,
a second checking circuit producing an output signal when the signal transmitted by said transmitting means have been correctly received, and
a fourteenth gate having its inputs coupled to the outputs of said first and second checking circuits.

16. A system according to claim 15, wherein
said first multicondition means are arranged in a plurality of groups;
a first parity scale-of-two counter coupled in common to each of said groups and said first scanning means in conjunction with said multicondition means to determine the number of a given binary condition transmitted by said transmitting means during the time of scanning one of said groups; and
said second checking circuit includes a plurality of second parity scale-of-two counters equal in number to said groups, each of said second parity counters storing said given binary condition transmitted during the time of scanning a corresponding one of said groups, and a fifteenth gate coupled to the 0-output of each of said second parity counters to provide the output for said second checking circuit.

17. A system according to claim 16, wherein said transmitting means transmits a first code at the start of a normal time cycle a second code at the start of the first error time cycle, a third code at the start of the second, third . . . and penultimate error time cycles, and a fourth code at the start of the last error time cycle; and said second circuit includes a storage means for storing said codes having its output activated upon receipt of said first code and its output deactivated upon receipt of either said second, third and fourth codes, the output of said storage means being coupled to each of said pairs of eleventh gates and an inverter for control thereof, the output of said inverter being coupled to each of said twelfth gates for control thereof.

18. A system according to claim 1, wherein said transmitting means transmits each of said first and second signals by means of two signals each having a different frequency.

19. A signalling system comprising first and second circuits linked by transmission means, the first circuit including a plurality of multicondition means, scanning means operatively connected to said first circuit to scan all of the multicondition means during normal repetitive signal time cycles so as to activate the transmission means to successively transmit information signals relative to the sequentially scanned multicondition means, each transmitted signal simultaneously representing the condition and identity of the scanned multicondition means, error detecting means associated with the first circuit to note any occurrence of an error in any of the multicondition means during any one of said repetitive signal time cycles whereby an error cycle is initiated during which an error signal is transmitted to the second circuit during the sequence time representative of the multicondition means having the error so as to identify the multicondition means having the error, the detecting means including gating means for alternately transmitting signal time cycles and error cycles until the errors have been eliminated, at which time repetitive signal time cycles resume.

References Cited by the Examiner

UNITED STATES PATENTS

| | | | |
|---|---|---|---|
| 1,972,326 | 9/1934 | Angel. | |
| 2,689,950 | 9/1954 | Bayliss et al. | |
| 2,719,959 | 10/1955 | Hobbs. | |
| 2,739,301 | 3/1956 | Greenfield | 340—183 |
| 2,905,520 | 9/1959 | Anderson | 340—183 X |
| 2,970,189 | 1/1961 | Van Dalen et al. | |
| 2,980,898 | 4/1961 | Mason et al. | |
| 3,047,843 | 7/1962 | Katz et al. | |
| 3,140,463 | 7/1964 | Taylor et al. | |
| 3,156,767 | 11/1964 | Van Duuren et al. | |
| 3,159,809 | 12/1964 | Fierston et al. | |

NEIL C. READ, *Primary Examiner.*

THOMAS B. HABECKER, *Examiner.*

R. M. ANGUS, *Assistant Examiner.*